(No Model.) 2 Sheets—Sheet 1.

E. S. HIDDEN.
MACHINE FOR CUTTING RAGS.

No. 487,621. Patented Dec. 6, 1892.

WITNESSES:

INVENTOR

BY Edw. S. Hidden

Earle H. Smith ATTORNEY (No Model.) 2 Sheets—Sheet 2.

E. S. HIDDEN.
MACHINE FOR CUTTING RAGS.

No. 487,621. Patented Dec. 6, 1892.

WITNESSES:
A. Faber du Faur Jr.
G. Emmermann

INVENTOR
BY Edwd S. Hidden
Earle H. Smith ATTORNEY

UNITED STATES PATENT OFFICE.

EDWARD S. HIDDEN, OF MILBURN, NEW JERSEY.

MACHINE FOR CUTTING RAGS.

SPECIFICATION forming part of Letters Patent No. 487,621, dated December 6, 1892.

Application filed August 24, 1891. Serial No. 403,605. (No model.)

*To all whom it may concern:*

Be it known that I, EDWARD S. HIDDEN, a citizen of the United States, and a resident of Milburn, in the county of Essex and State of New Jersey, have invented certain new and useful Improvements in Machines for Cutting Rags, of which the following is a specification.

The improvements relate to machinery for preparing rags and other material for the operations common to paper manufacture, and in particular to that system in which the stock is operated on with two sets of cutters, one set slitting it into strips and the other crosscutting the strips and reducing the stock or material to a size suitable for subsequent operations in the manufacture of paper; and the object is to produce an improved machine rapid and efficient in operation.

Figure 1:
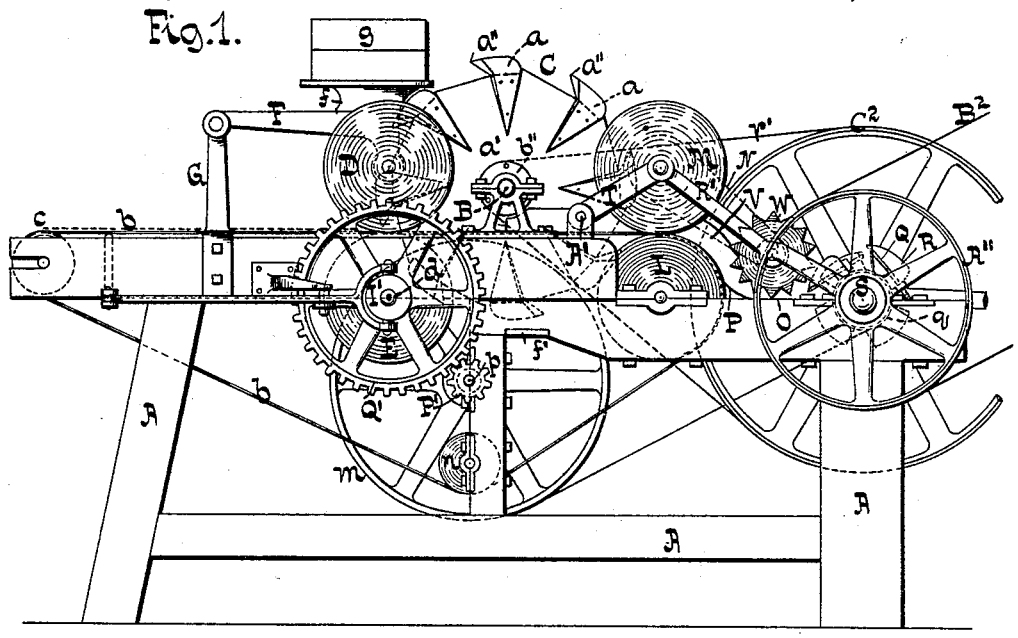
Figure 2:
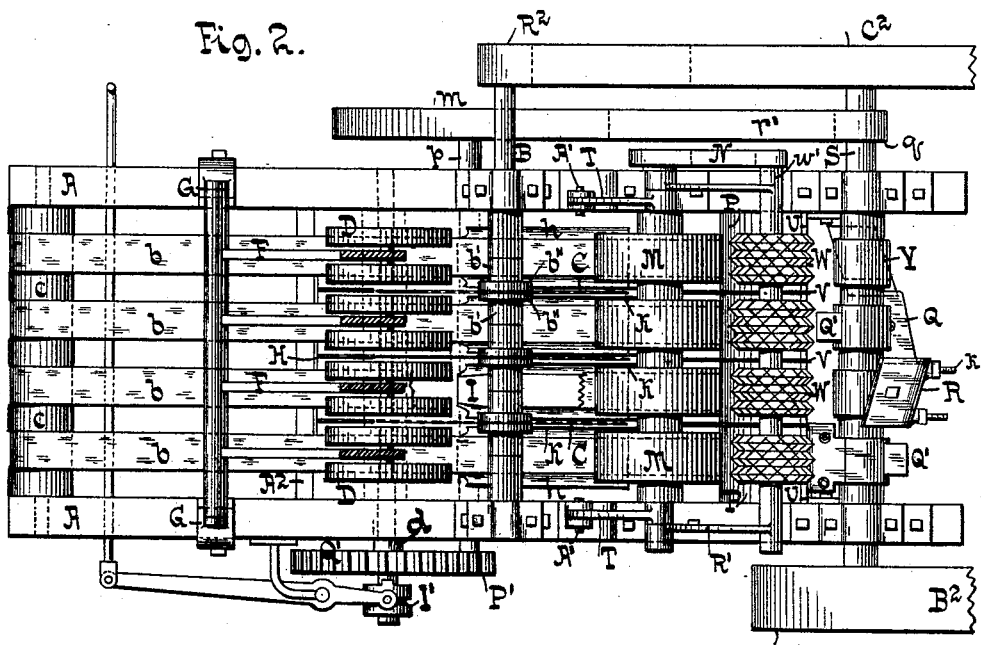
Figure 3:
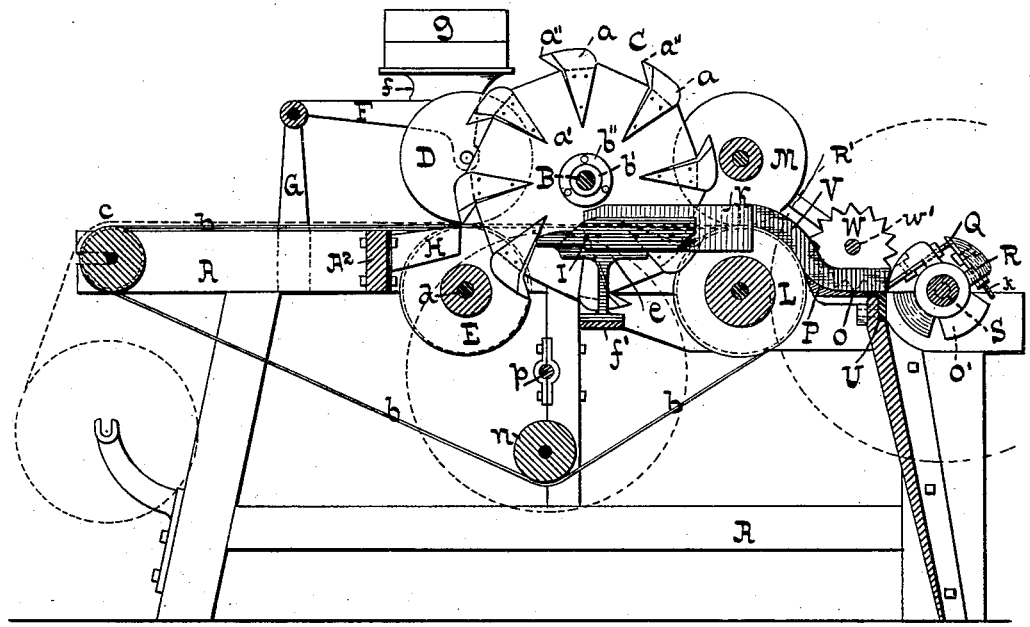
Figure 7:
Figures 4, 5:
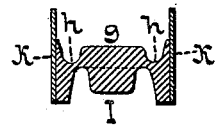
Figure 6:
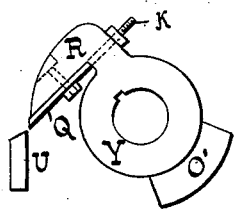

Referring to the annexed drawings, Figure 1 is a side elevation of the machine. Fig. 2 is a top view showing the conveying and feeding mechanism. Fig. 3 is a sectional view taken through the machine longitudinally. Figs. 4, 5, 6, and 7 are details hereinafter described.

In the drawings, A indicates a suitable frame sustaining all parts of the machine.

Mounted on a shaft or arbor B and properly secured thereto are a gang of circular cutters C, whose office is to slit the mass of rags or other stock into strips as the same is advanced and fed thereto by a competent feeding mechanism. The cutters C are composed, in brief, of radial blades $a$, arranged around the central shaft or arbor to follow each other in the same plane when the shaft is revolved. In practice the blades are made fast to or formed on the periphery of a body $a'$, consisting of a thin disk of steel made fast on the arbor, the whole constituting a circular cutter having a succession of projections arranged tangentially around a central body. At the outer end each blade has a point or projection $a''$ formed on the side, and this is brought to a sharp edge, so that as revolved its first action is to pierce the material or stock and then operate with a cutting action, slitting the stock into clean-cut strips, and this distinguishes the present invention from all others heretofore designed for a similar purpose, wherein saws are used to tear up the stock.

As a means for removably attaching the blades to the central disk, they are here shown as made with a tail-piece, which is riveted to the central disk $a'$; but the blade may be made removable by any means common to circular saws having removable teeth. Said cutters are shown in full lines in Figs. 1 and 3 and indicated by a dotted line in Fig. 2. A top view of one of the radial blades is given in Fig. 7, where it is seen as if looking directly at the periphery of the cutter C at $a$ $a''$, the dotted lines indicating the central disk $a'$. For such cutting and slitting action the blades are preferably formed with the line of their cutting-edge set at a tangent with the periphery of the cutter and there brought to a sharp knife-edge. In consequence when the cutter thus formed is revolved the points of the blades come down on the stock, slitting it open with a drawing cut. As shown, the cutting-edge is formed on the inside line of the blade and so cuts toward the axis of the cutter; but the operation will be analogous if the order be reversed and the cutter-edge made on the outside line. The cutters C are secured to the arbor B by means of flanged hubs $b'$, which are splined to the arbor, the body of the cutters being bolted to the flanges $b''$. The mates of adjoining pairs of these hubs meet, and thus the cutters are always maintained a fixed distance apart. This plan of holding the cutters C admits of an adjustment thereof as an entirety on the arbor lengthwise thereof.

The stock may be fed to the cutters C by any competent means. The mechanism shown is novel and consists, in part, of an endless belt (or rather belts) $b$, which collectively will be considered as a single device or apron, since all the belts or longitudinal sections of the apron move together as one. The object in making the apron thus in sections is to carry it past the cutters, and thus maintain a hold on the stock after it has been cut into strips, and serve as a means of aiding the machine to clear itself. The principal means of feeding the stock to the said cutters are under and upper pressure-rolls D and E. The apron $b$ works in co-operation with these feed-rolls. The sections of the conveying-apron pass around a small cylinder $c$, which is grooved to receive and hold them in position. This cylinder is journaled in slots in the frame A (see Fig. 3) to admit of taking up the slack of the apron and keeping the same taut. The apron carries the stock to the feed-rolls and aids in taking it away. The under feed-roll E is fixed on a shaft $d$ and reaches across the machine from side to side. It has deep narrow grooves to allow the slitting-cutters C to pass, and the sections of the conveying-apron are let into the periphery thereof and lie flush with or slightly below the surface of the rolls. The upper feed-rolls D are arranged to rise and fall to accommodate the local irregularities of the stock passing under them on the different sections of the conveying-apron, for which purpose they are represented as arranged in pairs at the end of the arms F, pivoted to standards G, fastened to the frame A. One mate of each pair is placed on each side of the arm F, which has a pin or stud affixed at the free end, entering both mates of the pair, the rollers thus turning independently on the said stud. There is one pair of the upper rolls to every section of the conveying-apron, and they are held down to their work and upon the apron and the under roll E by yielding pressure of weights or springs, according to convenience. In this case weights are used. The arm F has a branch $f$ shaped to receive a number of weights $g$, (omitted in Fig. 2 for perspicuity,) as may be required. Each pair of these rolls D is placed between the slitting-cutters C forward of the cutter-shaft B. The stock is carried up to the feed-rolls by the conveying-apron $b$, passing between the feed-rolls D and the upper surfaces of the said apron, whereby the feed is caused to take hold of the stock both from the upper and under sides thereof. At the same time the rotation of the lower feed-roll E, with the pressure of the upper rolls D holding the apron down thereon, imparts the traveling motion to the said apron. The cutter-shaft B may be set above or below the line of the apron. In this case it is placed above, and is the preferable arrangement.

Means are required to hold up the stock against the downward thrust and cutting action of the slitting-blades, and may be variously made. In the present machine it is held up to the front or edge of the cutter C by fingers H, being thin wide blades made fast to a cross-beam A of the frame and reaching up as nearly as possible to the edge of the cutters. To insure a clean cut, the stock thus supported in front is also sustained on both sides, being held in the grasp of the upper and under feed-rolls on both sides of the cutters, as in a vise, at the cutting-line—that is, at the point where struck and acted on by the piercing and slitting blades. For so holding the stock the under feed-rolls are arranged with the line of their peripheries intersecting the cutting-line at the point where the feed-rolls grasp and hold the stock, being immediately adjacent to the point of support afforded by the ends of the fingers H. (See Figs. 2 and 3.)

As before said, the conveying-apron is not only used for carrying the stock to the feed-rolls, but is also a means of conveying the stock past and to the rear of the said cutters C. In that operation the cut strips are liable to impede the action of the machine from the fact that the stock is cut and not sawed, so that there is no kerf, and hence the width of the said strips of stock exceeds the width of the space between these cutters by as much as the thickness of the cutters. Unless prevented this excess would cause the cut strips as they move along past the cutters to hug the sides of the cutters and clog the machine. I therefore provide for contracting the edges of said strips of stock directly upon the stock taking the form of strips. Such provision is here represented by a device I, termed a "shoe." (See Figs. 3 and 2, where a belt $b$ is broken away to expose it. Shown, also, in perspective in Fig. 4 and cross-section in Fig. 5.) These shoes occupy the space between the cutters C and on both sides thereof. They are supported on brackets $e$, made fast to a cross-beam $f'$, located directly below the cutter-shaft B, that is carried across from one side of frame A to the other. The shoes have a wide longitudinal elevation $g$ on their middle surface and grooves $h$ at the sides thereof. Such elevated portion is projected forward and chamfered down at the end, and the sections of the apron $b$ (or endless belts) ride over the shoes, with the strips of stock lying thereon. (Indicated by a dotted line in Figs. 1 and 3.) The grooved portion being shortened forms an offset $i$. The strips of stock are wider than the belts $b$ and their edges overhang the belts on both sides, whereby they are contracted in width sufficiently to withdraw their edges completely from the slitting-cutters and their flanges $b''$, insuring freedom of motion of the stock when it passes the cutters. As the strips are carried along, the overhanging edges come in contact with the offset portion $i$, which receives and controls such edges in the side grooves $h$, whereby the stock is prevented from getting under the belts.

The rear half of the cutters C and the blades thereon have an upward motion as they rotate, and the stock while carried along by the apron $b$ is liable to be caught by such blades and thrown up and forward or wound around by the cutter-shaft. To avoid this, shields are erected on both sides of said cutters close to but not in contact therewith. These shields are upright plates K, secured to any stationary part of the machine. In this case they are made fast, for convenience, to the sides of the shoes I. The conveying-apron on leaving the slitting-cutters passes around and operates a cylinder L and returns to the small cylinder $c$, passing under the tightening-roll $n$. The sections of the said apron after passing the cutters C still need guides to hold them in position relatively with each other as they retire below and return. Such guides may be variously made. Here the apron-cylinder has wide shallow grooves in its periphery which serve the purpose, such grooves receiving the sections of the apron flush therewith, or nearly so, as in the case of the under feed-roll E.

On top of the apron-cylinder L and revolved thereby is a roll M, which is useful in holding the sections of the apron in the grooves therefor in the cylinder L. It also aids the conveying-apron in maintaining the advance of the stock through the machine and in delivering the stock with the operation completed of slitting of the same into strips.

The shaft of the roll M is mounted in bearings at the end of arms T, jointed to the frame A at A', whereby the roll is permitted to rise and fall by its own gravity and accommodate itself to the surface of the strips of stock under it. As the apron passes downward, following the curve of its cylinder L, the stock is discharged therefrom on a table O. The clearance of the stock from the apron is insured by clearing-plates P, that are made fast to the table O, reaching up over the apron and lying as closely as possible thereto without touching. These clearing-plates receive the stock, preventing the apron from carrying it down, the strips of stock riding over said plates and falling on the table O. This table, I have ascertained, should be set at a lower level than the apron, so that the stock will be aided by gravitation in its discharge thereon from the retiring apron.

Thus far I have described that part of my machine relating to one of the operations performed on the stock, and this part of the machine is complete and operative in itself for slitting the stock into strips, after which it may be chopped crosswise in any manner desired.

I will now describe my combination, with the said slitting-machine, of another set of cutters, whose purpose is to crosscut or chop up the stock as it comes in strips from the slitting-cutters and reduce it to the proper condition for the usual pulping operations in making paper. For this purpose I do not restrict myself to special kinds of knives, so long as such knives as combined in this machine act to crosscut the strips with a chopping action. The crosscutting apparatus here consists of a "cylinder," of cutters adapted to cut against a stationary blade or blades at the end of a table O, and a claw-roll feed. In order to secure the advantages of the shear cut of a long spiral blade without its objections, I use a series of short knives Q. The cylinder is made in a number of sections, and the knives are secured thereto with their cutting-edges set in an angle to the axis of the cylinder. In the machine shown the sections are composed of wings R, forming part of cylinder $r$, made fast to a shaft $s$. The knives are secured to these wings and operate in connection with a single straight-edge blade $u$, that is secured to the end of the table O and extends across from side to side of the machine. The revolving knives Q are set at an angle to the axis of shaft S and ranged spirally around said shaft, whereby the advantage of a shear cut is secured with a simple form of blade easily sharpened and adjusted by persons of ordinary skill; and while well-known objections to a long spiral knife are avoided all the advantages of the spiral knife are obtained. The said knives are made fast to the wings R by a single bolt, which passes through a slot at mid-length of the knife. To adjust them with nicety to the stationary blade, screws $k$ are inserted in the wing to bear against the back of the knife, one at each end. I find it best to construct the wings with a flat inner surface to receive the knives on the inner side, as shown in cross-section in Fig. 6. In practice I have but one wing and one knife to each section of the knife-cylinder, and on the opposite side of the shaft I provide a counterbalance Q', whereby a slight momentum is gained between each cut, with the effect of easing the movement of the machine. The cylinder-sections correspond in number with the strips into which the stock has been cut, and in order to insure the presentation of these strips to the chopping-cutters at right angles thereto as nearly as may be guide-ribs V are erected on the table O, extending from the shields K of the slitting-cutters to the chopping-cylinder. These guide the strips and maintain them in their direct line of motion toward the chopping-knives. In front of these revolving knives and in close proximity to the clearing-plates P, I provide a special roll W, whose purpose is to seize the stock (draw it from the apron) and feed it to the crosscutting or chopping knives. It is deeply serrated or scored, both lengthwise and circumferentially, so as to leave $\wedge$-shaped points. These act like claws, penetrating the surface of the stock and taking a firm hold thereof; but by reason of their form the points also release their hold readily as the roll revolves. The roll may be operated in any convenient manner. In the machine shown it is driven by a belt N from a pulley on the shaft of roll M.

In order to avoid severing the separator-ribs V, the claw-roll W is made in sections. These are all secured firmly to one and the same shaft $w'$, which has its bearings at the ends of arms R', one at each side of the machine. These arms are hung at their opposite ends on the shaft of the delivering-roll, so as to admit an up-and-down motion of the claw-roll W to accommodate itself to the surface of the strips of stock, and the several sections of the roll rest on and carry forward the stock, forcing it toward the chopping-cutters. Motion is given to the machine by a belt $B^2$ from some motor to a pulley A'' on the shaft $s$ of the crosscutting-cylinder, which is the main shaft of the machine. Said shaft carries a drive-wheel $C^2$, from which a belt rotates the slitting-cutters C by a pulley $R^2$ on the cutter-shaft B. The lower feed-roll E is driven from the main shaft. The upper rolls are simply passive and follow the motion of the lower roll by resting thereon, and the endless apron is moved by frictional contact with the lower roll as held thereon by the pressure of the upper feed-rolls.

Means are provided for throwing the feed-rolls out of gear with the slitting-cutters, whereby the feed can be unshipped and disconnected from the cutter-shafts. This enables the attendant to stop the feed instantly for any purpose while the cutters continue in motion—as, for instance, to take out any foreign material he may discover in the stock as conveyed along by the apron, and so prevent the same from reaching and damaging the cutters, and to do this without the trouble of throwing off the main belt and stopping the whole machine. The construction and arrangement shown in the illustrative machine of the drawings consist of a spur-wheel $Q'$, running loosely on the shaft $d$ of the lower feed-roll E, said loose wheel receiving motion from a pinion $P'$ on one end of shaft $p$, the opposite end having fixed thereon a large band-wheel $m$, driven by a belt from a wheel or pulley $q$ on the main shaft S. $I'$ is an ordinary clutch splined to revolve with shaft $d$ of the feed-roll E (and slide freely thereon) and is constructed to engage with the loose wheel $Q'$, and thus couple the said loose wheel to the shaft $d$, whereby that wheel when so coupled revolves the lower feed-roll; but when the clutch is disengaged (the condition in which it is represented in Fig. 2) the wheel revolves loosely on the shaft, leaving the feed-rolls motionless. The clutch is operated by a lever arranged in any usual manner to suit the convenience of the attendant.

I claim as my invention—

1. The combination, in a rag-cutting machine, of revolving slitting-cutters composed of knife-edged blades ranged around a central disk, means of supporting the stock in front of such cutting-blades, feed-rolls above and beneath the stock, which hold it distended against the cutting action of the blades at the cutting-line thereof, and a sectional apron constructed and acting both to convey the stock to the feed-rolls and carry it away from the cutters, substantially as specified.

2. The combination, with the revolving cutters, of under and upper feeding-rolls and a conveying-apron made in longitudinal sections or belts, the upper rolls arranged in pairs, one to each apron-section, and adapted to yield independently to the local irregularities of the stock.

3. In combination, the revolving bladed slitting-cutters, the conveying-apron, a stationary support for the stock in front of said cutters, and the feed-rolls disposed on both sides of the cutters at the cutting-line and holding the stock distended against the action of the cutters thereon.

4. In combination, revolving slitting-cutters for cutting the stock into strips, a feeding device, a conveying-apron which carries the strips past the cutters, and means of contracting the strips and giving freedom thereto as they pass between the cutters, as set forth.

5. In combination with revolving cutters for slitting the stock into strips, means of support for the stock on both sides of the cutters, and a sectional conveying-apron, the shoes I, constructed as described and operating to govern the stock when cut into strips and prevent clogging, as set forth.

6. In combination, the rotary slitting-cutters, the feeding-rolls, means for conveying the stock to the feed-rolls, arranged and serving to carry it past the cutters, and shield-plates at the rear of the cutter-shaft, which prevent the cutter-blades from catching the stock as they rise in their rotary motion.

7. In combination, the revolving slitting-cutters, the feed-rolls, the sectional conveying-apron carrying the stock past the cutters, and a horizontal table set below the axis of the cutters, on which the slitted stock falls in strips.

8. The combination of the slitting-cutters, the conveying-apron, the receiving-table, and clearing-plates P for clearing the cut stock from the surface of the apron and preventing the same from being carried down with the apron as it returns below the table O.

9. The combination of the slitting-cutters, the feeding-rolls, a sectional conveying-apron which both conveys the stock to the feed-rolls and carries it away from the cutters, a table on which the slitted stock falls, and serrated claw-rolls W, which seize the stock and draw it away from the conveying-apron.

10. The combination, with the slitting-cutters, the feed-rolls therefor, and mechanism for actuating the same, of a clutch arranged for disconnecting the operation of the feed without stopping the machine, as set forth.

11. The combination of revolving chopping-knives, means for feeding the stock thereto in strips, and guiding-ribs which maintain the strips in right lines and guide the strips to the chopping-knives.

12. The combination of revolving slitting-cutters, mechanism for feeding the stock thereto, conveying it away, and discharging it in strips on a receiving-table, cross-cutting knives acting against a stationary blade at the end of the table, and serrated rolls which seize the slitted stock and transfer it to the said chopping-knives.

13. In combination, the table supporting the stock, a chopping device consisting of a series of knives arranged spirally around a cylinder with their cutting-edges set at an angle to the axis thereof and adapted to cut against a stationary blade at the end of the table, serrated claw-rolls to feed the stock thereto in strips, and guiding-ribs to guide the stock and present the strips at right angles to the chopping-cutters.

EDWARD S. HIDDEN.

Witnesses:
EARLE H. SMITH,
JAMES M. TULLY.